United States Patent [19]

Jones

[11] 3,791,509
[45] Feb. 12, 1974

[54] MAGNETIC HOPPER SYSTEM FOR LOADING AND UNLOADING A CONVEYOR

[75] Inventor: Alan Richardson Jones, Miami, Fla.

[73] Assignee: Coulter Chemistry, Inc., Maunabo, P.R.

[22] Filed: Nov. 3, 1971

[21] Appl. No.: 195,363

[52] U.S. Cl. .............. 198/41, 214/6 BA, 214/8.5 R
[51] Int. Cl. ... B65g 17/46, B65g 57/30, B65g 59/06
[58] Field of Search. 214/6 BA, 8.5 C, 8.5 K, 8.5 R; 198/41, 35; 221/270

[56] References Cited
UNITED STATES PATENTS

| | | | |
|---|---|---|---|
| 2,940,327 | 6/1960 | Gartner | 214/6 BA |
| 2,544,735 | 3/1951 | Stricklef | 214/6 BA |
| 2,238,725 | 4/1941 | Fry | 221/270 |
| 1,805,029 | 5/1931 | Baker | 214/6 BA |

FOREIGN PATENTS OR APPLICATIONS

| | | | |
|---|---|---|---|
| 950,275 | 2/1964 | Great Britain | 198/41 |

Primary Examiner—Edward A. Sroka
Attorney, Agent, or Firm—Silverman & Cass

[57] ABSTRACT

The system includes a first magnetic plate mounted in a generally upright position at a first location adjacent a conveyor and adapted to hold thereagainst a plurality of objects each having a magnetizable material therein. The plate has two slots therein and a movable finger in each slot which is adapted to engage the top side of the object for sequentially moving objects downwardly onto the conveyor. A second magnetic plate is mounted in a generally upright position at a second location downstream from the first location and adjacent the conveyor. A vertically reciprocal ram powered by a pneumatic cylinder is situated at the second location and is adapted to move upwardly to sequentially move objects from the conveyor onto the second plate as each object reaches the second location.

25 Claims, 6 Drawing Figures

PATENTED FEB 12 1974 3,791,509

3,791,509

MAGNETIC HOPPER SYSTEM FOR LOADING AND UNLOADING A CONVEYOR

BACKGROUND OF THE INVENTION

The invention relates to a system for storing sample cup holders, for sequentially moving the stored sample cup holders onto a conveyor at a first location, for sequentially moving the holders from the conveyor at a second location downstream from the first location and for storing the sample cup holders at the second location.

More specifically the invention relates to a system of the type described for use in an automatic chemical analysis apparatus where specimen samples to be analyzed are held in cups which are stored in elongated block-shaped sample cup holders. These sample cup holders are moved by positive engagement of same with a conveyor mechanism in a horizontal plane past a series of sampling head which withdraw aliquots of the samples into an analytical apparatus. The system of the invention provides a convenient means for holding the sample cup holders in close proximity to the conveyor mechanism prior to their engagement with a conveyor chain of the conveyor mechanism and a convenient means for receiving and temporarily storing the sample cup holders subsequent to their horizontal conveyance past the sampling heads.

SUMMARY OF THE INVENTION

According to the invention there is provided a system for storing objects at a first location adjacent a conveyor and for sequentially moving the objects onto the conveyor. The system includes a generally upright member which is capable of magnetically holding thereagainst a plurality of objects each having magnetizable material therein, and a mechanism for sequentially moving objects from the generally upright member onto the conveyor.

Also according to the invention there is provided a system for unloading objects from a conveyor and for temporarily storing the objects, the system including a generally upright member which is capable of magnetically holding thereagainst a plurality of objects having magnetizable material therein and a mechanism for moving an object from a position on the conveyor adjacent the generally upright member onto the upright member.

Preferably the upright members are plates having a coating of material thereon in which are embedded magnetized ferrite particles. Also, the two systems described above are preferably combined to form a magnetic hopper system for loading and unloading sample cup holders onto and from a conveyor in an automatic chemical anaylsis apparatus.

DESCRIPTION OF THE PREFERRED EMBODIMENT OF THE INVENTION

Figure 1:
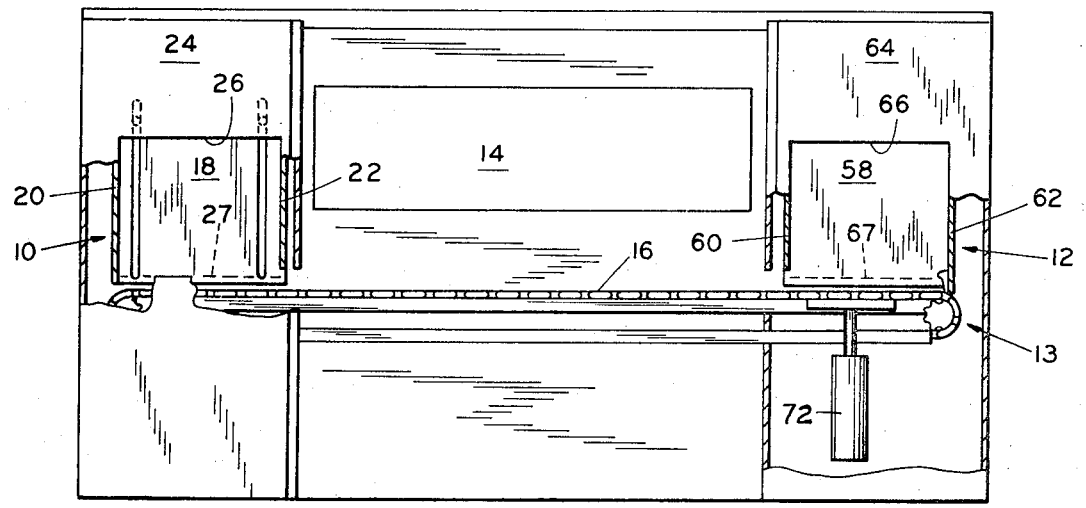
FIG. 1 is a fragmentary elevational view of a portion of an automatic chemical analysis apparatus incorporating the hopper system of the invention.
Figure 2:
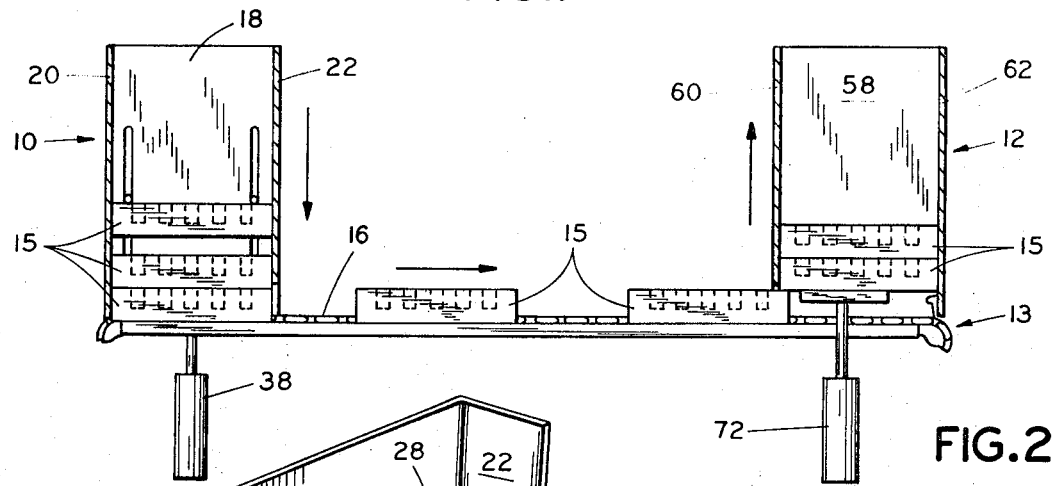
FIG. 2 is a frgmentary elevational view similar to FIG. 1 but showing sample cup holders in the hoppers of the system of the invention with arrows indicating the path traveled by each holder.

The magnetic hopper system of the invention is shown in FIGS. 1 and 2 and includes first and second spaced apart hoppers or magazines 10 and 12 mounted adjacent a conveyor mechanism 13. In the illustrated embodiment the magazines 10 and 12 are located, respectively, at the upstream and downstream ends of a sampling station 14 in an automatic chemical analysis apparatus particularly adapted for making automatic tests of analyses of blood samples. The blood samples are first obtained from a patient and then placed in sample cups which in turn are placed in a block-shaped sample cup holder 15 (FIGS. 2–5). In accordance with the teachings of the invention and as best shown in FIG. 2 a plurality of holders 15, each having a magnetizable material therein, are stored in the first magazine 10 and sequentially moved into engagement with a chain 16 of the conveyor mechanism 13 at predetermined times. The holders 15 are then indexed by the conveyor mechanism 13 along and on a supporting surface 17 (FIG. 3) past sampling heads (not shown) at the sampling station 14 toward the second magazine 12 at the downstream end of the sampling station 14. After a holder 15 is moved into the bottom of the second magazine 12 it is moved off of the conveyor mechanism 13 and upwardly into the magazine 12.

Figure 3:
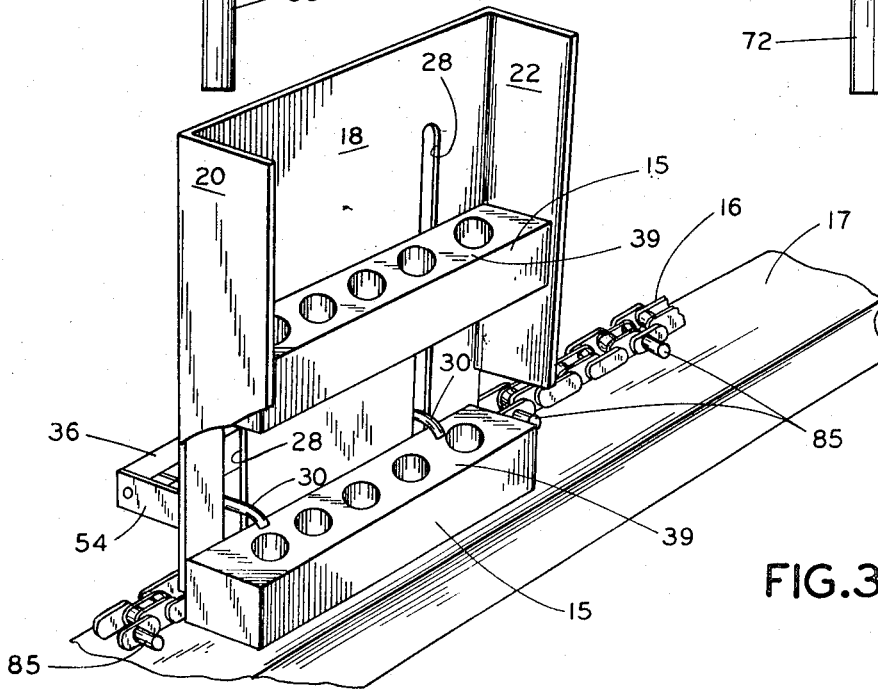
FIG. 3 is a fragmentary perspective view of the first hopper of the system of the invention shown in FIGS. 1 and 2.

As best shown in FIG. 3 the magazine 10 includes a generally upright member 18, preferably a steel plate, which is either magnetized or coated with a magnetic substance. In one preferred embodiment of the invention the plate 18 is coated with a layer of rubber in which there is embedded magnetized ferrite particles that have been magnetized in such a manner that the magnetic poles of the particles are randomly distributed in the layer of rubber.

Vertical side walls 20 and 22 are connected to opposite side edges of the plate 18 to form the magazine 10 with a channel shape. When the magazine 10 is used in an automatic chemical analysis apparatus a front plate 24 (FIG. 1) is secured to the side walls 20 and 22 in spaced relation to the plate 18. The front plate 24 has an opening 26 therein providing access to the magazine or hopper 10 so that holders are "front loaded" through the opening 26 into the magazine 10. Since part of the front plate 24 is broken away in FIG. 1, a broken line 27 delineates the lower edge of the opening 26.

The plate 18 has two vertical slots 28 therethrough which receive respectively, one of two fingers 30 which form part of a mechanism for moving the holders 15 sequentially from the plate 18 onto the conveyor chain 16. The fingers 30 are connected behind the plate 18 by a cross bar 36 partially shown in FIG. 3. A conventional pneumatically operated piston and cylinder mechanism 38 (FIG. 2) is connected to the cross bar 36 and is operated at predetermined intervals for moving the lowermost holder 15 in the magazine 10 onto the conveyor chain 16.

The fingers 30 are deflectable when they are moved upwardly so that they can be moved in the slots past the next lowermost holder 15 on the plate 18 to a position above the next lowermost holder 15 where the fingers can engage the topside 39 of that holder 15 for moving that holder 15 downwardly onto the conveyor chain 16. In the illustrated embodiment of the invention each of the fingers 30 includes a counterweight as best shown in FIG. 6.

Figure 5:
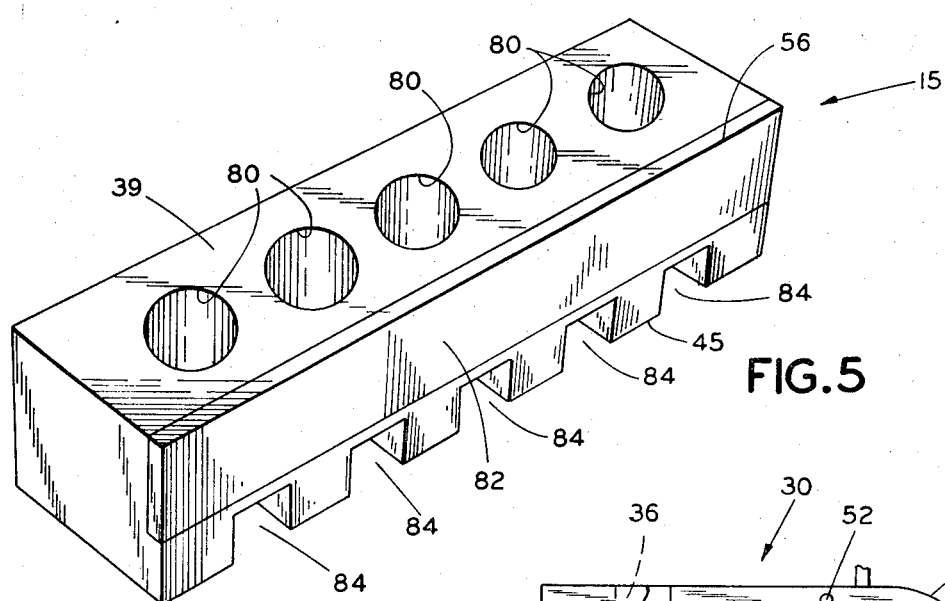
FIG. 5 is a perspective view of one of the sample cup holders shown in FIGS. 2 and 3 and showing the back side thereof.
Figure 6:
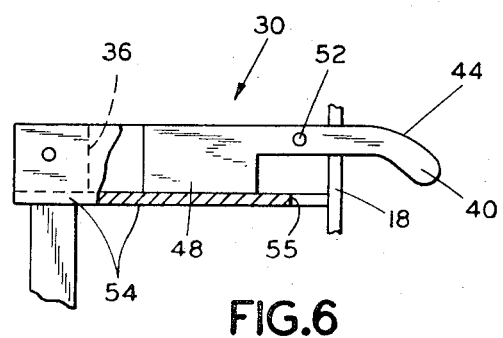
FIG. 6 is a side view of one of the deflectable fingers forming part of the mechanism for sequentially moving holders onto the conveyor.

As shown in FIG. 6 each finger 30 has a front portion 40 having a curved topside 44, which facilitates sliding engagement of the topside 44 with the back lower edge 45 (FIG. 5) of a holder 15 held against the plate 18 as the finger 30 is moved upwardly. The finger 30 also has a back portion 48 which extends rearwardly and downwardly from the front portion 40. The finger 30 is pivotly mounted at 52 to a bracket 54 in such a way that the center of gravity of the finger 30 is behind the pivot point 52. The bracket 54 is secured to the cross bar 36 and has a bottom opening 55 through which the finger 30 extends when it engages a holder 15 and pivots about the pivot point 52. It is to be noted that the shape of the finger portion 48 is such that when the finger 30 engages the back lower edge 45 (FIG. 5) of a holder 15 and pivots about its pivot point to a generally vertical position the center of gravity of the finger 30 is still located behind the pivot point 52 so that after the front portion 40 of the finger slides past the back top edge 56 (FIG. 5) of a holder 15 on the plate 18, the finger 30 falls back to its normal holder engaging position. In this respect, the finger portion 48 constitutes the counterweight.

Figure 4:
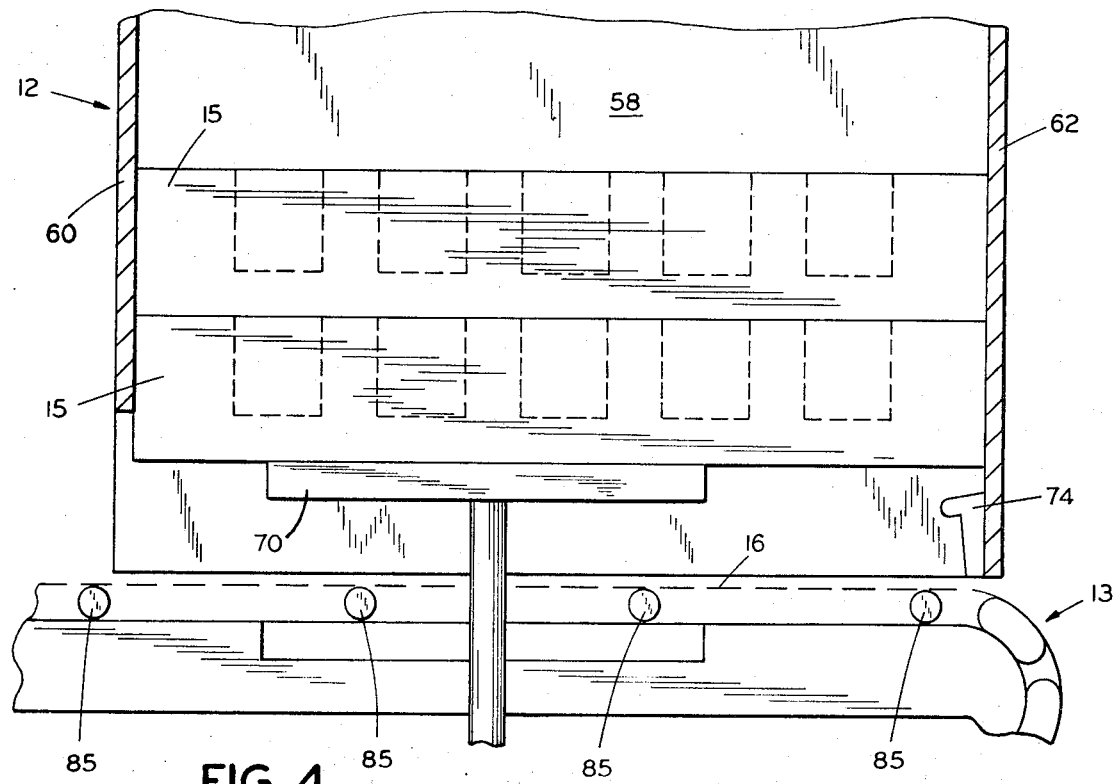
FIG. 4 is a fragmentary elevational view of the second hopper of the system of the invention shown in FIGS. 1 and 2.

Referring now to FIGS. 2 and 4, the second hopper or magazine 12 is formed in substantially the same manner as the first magazine 10 and includes a generally upright member 58, preferably a steel plate, which is magnetized or coated with a magnetic substance. In one preferred embodiment of the invention the plate is coated with a layer of rubber in which there is embedded magnetized ferrite particles that have been magnetized in such a manner that the magnetic poles of the particles are randomly distributed in the layer of rubber. The second magazine 12 also includes two vertically extending side walls 60 and 62 connected to the side edges of the plate 58 to form the magazine 12 with a channel shape. Also a front plate 64 is secured to the walls 60 and 62 in spaced relation to the plate 58. The front plate 64 has an opening 66 therein providing access to the second hopper 12 and to the plate 58, the bottom edge of the opening 66 being delineated by a broken line 67.

A vertically reciprocal ram 70 operated by a suitable pneumatic piston and cylinder mechanism 72 is mounted beneath the second hopper 12 adjacent to the conveyor 16. In the illustrated embodiment a limit switch 74 extends from the side wall 64 in position to engage and be actuated by a holder 15 moved on the conveyor into the lower end of the second hopper or magazine 12. In the operation of the system of the invention a holder 15 moved by the conveyor chain 16 into the lower end of the second hopper 12 engages the limit switch 74, causing operation of mechanism 72 which moves the ram 70 upwardly. The ram 70 then engages the bottom side of the holder 15 and moves the holder 15 upwardly adjacent the vertical plate 58 to a temporary storage position where it is magnetically held to the plate 58.

Although in the illustrated embodiment of the invention a limit switch 74 is shown for actuating the mechanism 72 it is to be understood that other actuating means such as proximity switches or photocell circuits can be utilized for this purpose.

It will be understood that the upright members 18 and 58 are provided with sufficient magnetism to establish a magnetic coupling force between each member 18 and 58 and the holders 15 placed thereagainst to overcome the force of gravity acting on each holder 15.

Also it is to be understood that the operation of the mechanism 38 for moving the holders 15 downwardly adjacent the plate 18 and onto the conveyor chain 16 is synchronized with the operation of the conveyor mechanism 13 and with the operation of a sampling mechanism (not shown) situated at the sampling station 14.

In FIG. 5 is shown an enlarged view of one of the sample cup holders 15 viewing the same from the back side thereof. The holder 15 is shown with five pockets 80 in the top side 39 thereof for receiving and holding sample cups (not shown). Of course the holders 15 can be longer or shorter with more or less than five pockets 80 therein. In the illustrated embodiment, the holder 15 is preferably made from a non-metallic material such as a plastic with a steel strip 82 secured to the back side thereof. Recesses 84 are provided in the lower back side of the holder 15 and are adapted to receive studs 85 (FIG. 4) extending from selected pintles of the conveyor chain 16 whereby a positive engagement is made between the chain 16 and each holder 15.

It is to be noted that by providing the random distribution of magnetic poles on the plates 18 and 58 and by placing the magnetizable material — steel strip 82 — at the back side of each holder 15, the sample cups are exposed to very very little if any of the magnetic forces established between the magnetic poles. Consequently the magnetic hopper system of the invention can be utilized for storing samples sensitive to magnetic forces.

It is also to be noted that the side walls 20 and 22 of the magazine 10 are preferably spaced apart a distance substantially equal to the length of each holder 15 so that the channel formed between the side walls 20 and 22 defines a guideway for the holders 15 as they are moved into engagement with the chain 16, the guideway ensuring proper registration of the recesses 84 with the selected studs 85.

Although the hopper system of the invention for loading and unloading a conveyor has been described with particular reference to its use in an automatic chemical analysis apparatus, it is to be understood that the system of the invention can be utilized in other environments with other objects besides sample cup holders. Also it is to be understood that obvious modifications and variations can be made to the system of the invention without departing from the spirit or scope of the invention. For example other means besides fingers 30 in slots 28 can be utilized for moving objects from the plate 18 in the first hopper 10 onto a conveyor. Also the objects can be moved upwardly onto a conveyor rather than downwardly onto a conveyor. Accordingly the scope of the present invention is only to be limited as necessitated by the accompanying claims.

What it is desired to secure by Letters Patent of the United States is:

I claim:

1. A system for storing a plurality of generally elongate objects at a first location adjacent a generally horizontal conveyor with the long axis of each object extending generally horizontally, for sequentially delivering the objects to the conveyor at that location, for unloading the objects from the conveyor at a second location downstream from the first location, and for storing the objects at the second location with the long axis of each object extending generally horizontally, said system including a generally upright member mounted at the first location adjacent the conveyor, said member having means for magnetically holding thereagainst a plurality of generally elongate objects each of which has magnetizable material therein, first means for sequentially moving objects transversely of the long axis of each object from said generally upright member onto the conveyor, a second generally upright member mounted at a second location downstream from said first location and adjacent the conveyor, said second upright member having means for magnetically holding thereagainst a plurality of the objects, and second means at said second location for moving each object arriving at said second location transversely of the long axis of each object from the conveyor onto said second generally upright member.

2. The system as claimed in claim 1 wherein said generally upright members are vertical plates.

3. The system as claimed in claim 1 wherein said means for magnetically holding objects against at least one of said generally upright plates includes a coating of material on said member including a plurality of magnetized ferrite particles embedded in a binder, said particles having been magnetized in such a manner that the magnetic poles of said particles are randomly distributed throughout said material.

4. The system as claimed in claim 1 wherein said first generally upright member has at least one vertical slot therein and said means for moving objects from said first member onto the conveyor includes a finger received in said slot and power means for reciprocating said finger in said slot.

5. The system as claimed in claim 4 wherein said finger is deflectable when moved upward against and past an object on said first member and is rigid when moved downwardly into engagement with the topside of the object.

6. The system as claimed in claim 1 wherein said second means includes a ram mounted at said second location adjacent said second generally upright member, power means for reciprocating said ram, and trigger means actuated when an object is received at said second location for operating said power means to reciprocate said ram to move said object from the conveyor and onto said second generally upright member.

7. A system for storing generally elongate objects each having magnetizable material therein with the long axis of each object extending generally horizontally and for sequentially delivering the objects to a generally horizontal conveyor, said system including a generally upright member located adjacent a conveyor, said generally upright member having means for magnetically holding a plurality of objects thereagainst, and means for sequentially moving objects transversely of the long axis of each object from said generally upright member onto the conveyor.

8. The system as claimed in claim 7 wherein said generally upright member is a vertical plate.

9. The system as claimed in claim 7 wherein said means for magnetically holding objects against said member includes a coating of material on said member, said material including a plurality of magnetized ferrite particles embedded in a binder, said particles having been magnetized in such a manner that the magnetic poles of said particles are randomly distributed throughout said material.

10. The system as claimed in claim 7 wherein said generally upright member has at least one vertical slot therein and said means for moving objects from said member onto the conveyor includes a finger received in said slot and power means for reciprocating said finger in said slot.

11. The system as claimed in claim 4 wherein said finger is deflectable when moved upward against and past an object or said generally upright member and is rigid when moved downwardly into engagement with the topside of the object.

12. The system as claimed in claim 11 wherein said finger is pivotably mounted and includes a counterweight mechanism for urging said finger to its object engaging position after said finger moves past the topside of the object.

13. A system for unloading generally elongate objects from a conveyor and for storing the objects each of which has magnetizable material therein with the long axis of each object extending generally horizontally, said system including a generally upright, rectangular plate-shaped member located adjacent a generally horizontal conveyor and having permanent magnet means for magnetically holding thereagainst a plurality of the objects, and means located in close proximity to said generally upright member for sequentially moving objects transversely of the long axis of each object from the conveyor onto the generally upright member as and when each object is moved by the conveyor to a position adjacent the generally upright member.

14. The system as claimed in claim 13 wherein said moving means includes a ram mounted adjacent the lower end of said generally upright member, power means for reciprocating said ram, and trigger means actuated when an object is moved by the conveyor to a position adjacent the lower end of said member for operating said power means to reciprocate said ram to move the object from the conveyor and onto said generally upright member where the object is held by magnetic force on said member.

15. The system as claimed in claim 14 wherein said trigger means includes a limit switch located adjacent one edge of said generally upright member.

16. The system as claimed in claim 13 wherein said generally upright member is a vertical plate.

17. The system as claimed in claim 13 wherein said permanent magnet means for magnetically holding objects against said generally upright plate includes a coating of material on said member, said material including a plurality of magnetized ferrite particles embedded in a binder, said particles having been magnetized in such a manner that the magnetic poles of said particles are randomly distributed throughout said material.

18. A system for storing generally elongate objects with the long axis of each object extending generally horizontally and for sequentially delivering the objects to a generally horizontal conveyor, each of the objects having magnetizable material therein and means for positively engaging the conveyor, said system including a generally upright magazine
located adjacent the conveyor and means for sequentially moving objects transversely of the long axis of each object from the magazine onto the conveyor, said magazine including a generally upright member having means for magnetically holding a plurality of objects thereagainst and first and second spaced apart side walls connected to said member and defining therebetween a channel shaped guideway for guiding the generally elongate objects into proper registration with object engaging means on the conveyor as each object is moved from the magazine onto the conveyor.

19. A sample cup holder for use in an automatic chemical analysis apparatus, said holder being adapted to be temporarily stored in a magnetic hopper of a hopper system in the apparatus and having a generally rectangular block shape with a plurality of sample cup receiving pockets therein, a strip of magnetizable material secured to one side thereof, and a plurality of recesses therein, said recesses being adapted to receive holder engaging means on a conveyor whereby positive engagement can be effected between said holder and the conveyor for transporting said holder.

20. A magnetic hopper system for loading and unloading sample cup holders onto and from a conveyor in an automatic chemical analysis apparatus, each holder having a strip of magnetizable material on one side thereof, said system including a first magazine located adjacent a conveyor at the upstream end of a sampling station of the apparatus, a second magazine located at the downstream end of the sampling station, each magazine including a vertically disposed plate coated with a magnetic substance and first and second spaced apart sidewalls connected to said plate and defining therebetween a channel shaped guideway, said plate of said first magazine having first and second vertical slots therein, means for sequentially moving holders from said first magazine onto the conveyor, said means including deflectable fingers which are received in and vertically movable in said slots for engaging and moving a holder in said first magazine downwardly in said guideway onto said conveyor and in registration with holder engaging means on the conveyor, and means at the bottom of said second magazine for moving said holders upwardly from the conveyor into said second magazine, said moving means including a vertically reciprocal ram, power means for reciprocating said ram, and switching means, actuated upon movement of one of said holders by the conveyor to a position between said sidewalls of said second magazine, for operating said power means to move said ram.

21. A system for storing elongate sample cup holders each having magnetizable material therein with the long axis of each holder extending generally horizontally and for sequentially moving the holders transversely of the long axis of each holder relative to a conveyor, said system including a generally upright, rectangular plate-shaped member located adjacent a conveyor, said generally upright member having permanent magnet means for magnetically holding a plurality of the holders thereagainst with the long axis of each holder extending generally horizontally, and means for sequentially moving the holders transversely of the long axis of each holder between said generally upright member and to the conveyor.

22. The system according to claim 21 wherein said moving means is operable only to move holders onto the conveyor.

23. The system according to claim 22 wherein said generally upright member has at least one vertical slot therein and said means for moving holders include a finger received in said slot and power means for reciprocating said finger in said slot.

24. The system according to claim 21 wherein said moving means is operable only to move holders off of the conveyor.

25. The system according to claim 24 wherein said moving means includes a ram mounted adjacent the lower end of said generally upright member, power means for reciprocating said ram, and trigger means actuated when a holder is moved by the conveyor to a position adjacent the lower end of said member for operating said power means to reciprocate said ram to move the holder from the conveyor and onto said generally upright member where the holder is held by magnetic force on said member.

* * * * *